OR 3,843,929

X5382R

United St

Mayle

[11] 3,843,929

[45] Oct. 22, 1974

[54] AUTOMATIC T.V. SHUT-OFF DEVICE RESPONSIVE TO ABSENCE OF SYNC. SIGNAL

[75] Inventor: Louis F. Mayle, Fort Wayne, Ind.

[73] Assignee: The Magnavox Company, Fort Wayne, Ind.

[22] Filed: Aug. 21, 1970

[21] Appl. No.: 66,093

Related U.S. Application Data

[63] Continuation of Ser. No. 675,664, Oct. 16, 1967, abandoned.

[52] U.S. Cl. .......... 325/392, 178/DIG. 15, 325/393, 325/395

[51] Int. Cl. .......................... H04b 1/16, H04n 5/44

[58] Field of Search .......... 325/395, 391, 392, 393, 325/492; 178/DIG. 15

[56] References Cited

UNITED STATES PATENTS

| | | | |
|---|---|---|---|
| 2,923,862 | 2/1960 | Teich | 178/6 T |
| 3,172,041 | 3/1965 | Payne et al. | 325/391 |
| 3,378,775 | 4/1968 | Joseph | 325/395 |

*Primary Examiner*—Robert L. Griffin
*Assistant Examiner*—Marc E. Bookbinder
*Attorney, Agent, or Firm*—T. A. Briody; W. W. Holloway; R. T. Seegar

[57] ABSTRACT

Apparatus for automatically turning off any device, as for example a television receiver, upon the discontinuance of a certain signal component for a preselected period of time. The automatic shut-off feature is incorporated into a conventional television receiver without in any way affecting the normal operation of the television receiver until the station to which the set is tuned, leaves the air. When a station leaves the air, this will be sensed as a loss of a signal component, as for example, the synchronizing signal and automatically thereafter there will be energized a timer mechanism which is effective after a preselected period of time to shut off the television set; but, without in any way interfering with a subsequent turning on of the set by a viewer to a selected television broadcast when the station has resumed broadcasting. The invention is particularly useful where television sets are installed in bedrooms and the televiewer falls asleep, allowing the television set to stay on after the television station has ceased broadcasting.

9 Claims, 6 Drawing Figures

PATENTED OCT 22 1974

3,843,929

INVENTOR.
LOUIS F. MAYLE

BY

Jeffers and Young
ATTORNEYS

INVENTOR.
LOUIS F. MAYLE

BY

Jeffers and Young
ATTORNEYS

INVENTOR.
LOUIS F. MAYLE

BY

Jeffers and Young
ATTORNEYS

INVENTOR.
LOUIS F. MAYLE

BY
Jeffers and Young
ATTORNEYS

AUTOMATIC T.V. SHUT-OFF DEVICE RESPONSIVE TO ABSENCE OF SYNC. SIGNAL

This application is a continuation application of my copending application filed Oct. 16, 1967, entitled "AUTOMATIC TV SHUT-OFF RESPONSIVE TO ABSENCE OF SYNC SIGNAL," Ser. No. 675,664, now abandoned.

BACKGROUND OF THE INVENTION

This invention relates to an automatic shut-off device for equipment such as a television receiver. Various devices have been proposed which will automatically shut off devices such as radio receivers. Such devices have, for the most part, been unsatisfactory since they must be "set" for each tunable channel or station, and this additional requirement, detracts from the basic purpose of automatic shut-off device which is, to automatically and without any requirement on the part of the viewer have the set completely shut off after the station or channel has "signed off." In another illustration of how the prior art has attempted to meet this problem, there has been used a clock as an integral part of the television receiver to shut off the receiver at the time for which it is set. The clock will, at the preset time, automatically shut off or turn on the set, but the main disadvantage of this arrangement is that the clock must itself be "set."

OBJECTS OF THE PRESENT INVENTION

It is one of the foremost objects of the present invention to provide a completely automatic means which will turn off a television receiver or any other device to which it is applied, when there is absent a certain signal component for a predetermined period of time.

The automatic shut-off feature will apply whether the television station has ceased broadcasting, or it is malfunctioning, or if the set is itself improperly tuned.

A still further object of the present invention is to provide a simple but inexpensive shut-off device which can be readily incorporated into a television receiver to perform the function of turning off the television receiver, automatically and without preset, and will perform its intended function without any need for "adjustment" or "set" on the part of the operator. Therefore, the television receiver will continue to function, but will, without any intervention of the operator, turn off the television receiver after the broadcasting has ceased, or the set is malfunctioning, or the set is not properly tuned, or the broadcasting station is itself experiencing malfunctioning.

Another object of the present invention is to provide a device for automatically shutting off a television receiver, which can be incorporated into various portions of the television receiver, as for example, within the search tuning circuit, or within a remote control device, and in which the device can be comprised of simple and inexpensive components.

Other objects and features of the present invention will become apparent from a consideration of the following description which proceeds with reference to the accompanying drawings, wherein a plurality of example embodiments are illustrated by way of example.

Figure 1:
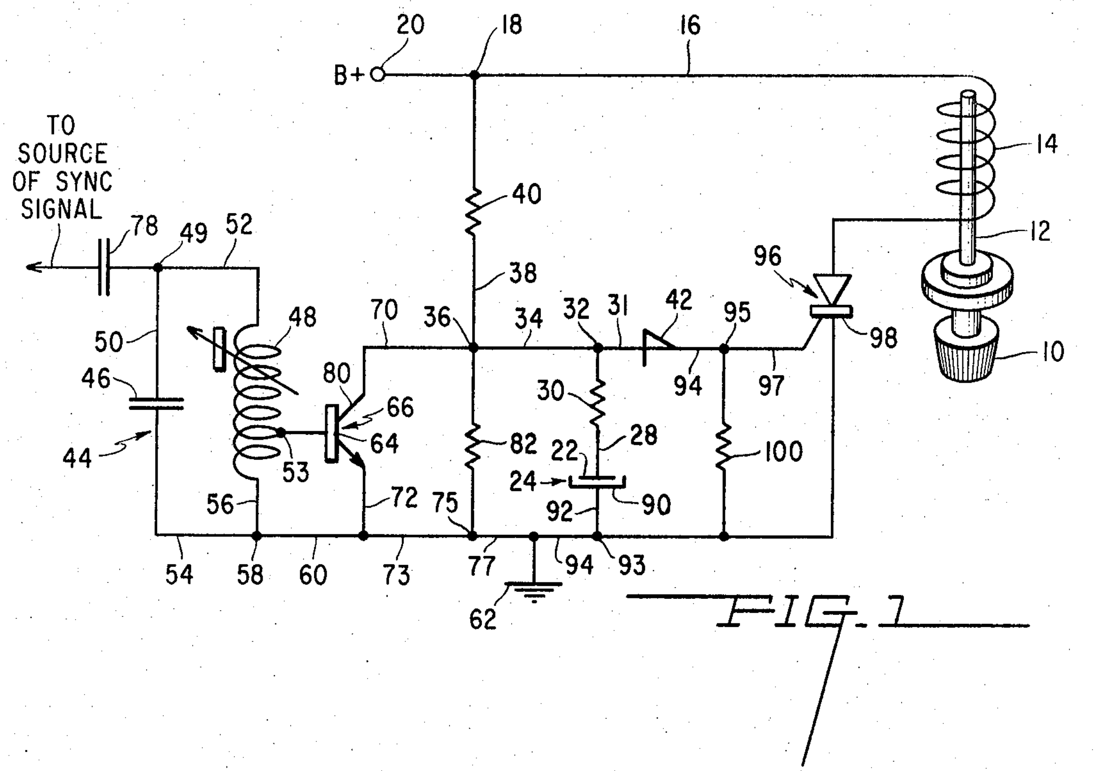
FIG. 1 is a schematic diagram illustrating an embodiment of my invention.

Referring now to the drawings, and in particular to the embodiment in FIG. 1, a television receiver (not shown) is manually turned off and on by means of a control knob 10, having a plunger 12 which is displaced from a center position in the solenoid windings 14, connected to a conductor 16 and terminal 18 to a voltage source 20. When the television receiver is initially turned on manually, by pulling the control knob 10 outwardly, the voltage source 20 causes a charging current to flow into 100 microfarad, 35 volt, electrolytic capacitor 24 through charging resistor 40, conductor 38, junction 36, conductor 34, junction 32, resistor 30, and conductor 28 to anode 22 of the electrolytic capacitor. It takes approximately 1 to 2 minutes for voltage on the anode 22 of capacitor 24 to reach the firing potential of a four-layer diode 42, which is connected to the anode 22 of the capacitor through conductors 28 and 31. If prior to the lapsed one to two minutes, the television receiver is tuned to a television station, such voltage build up on the capacitor will be prevented in a manner next to be described, such voltage build up being used to turn off the set if tuning fails to occur during the prescribed 1 to 2 minutes. At the time of tuning a broadcasting station, a sync signal is developed, and a tank circuit, designated generally by reference numeral 44, is activated thereby. The tank circuit is comprised of a 1,000 pF capacitor 46 and a tunable inductance 48, connected in parallel through a junction 49, conductors 50, 52, 54, and 56 to a junction 58 thence from conductor 60 to ground 62. The tank circuit is excited at 31.5 kc from the second harmonic of the 15.75 kc sync signal and the effect of the activated tank circuit is to cause pulses of current in the base circuit of an NPN transistor 66, causing it to become conductive. The base connects to a tap 53 on variable inductor 48. With sufficient base current, the transistor will saturate on positive peaks of voltage at tap 53. When the transistor 66 is conductive, the capacitor 24 is discharged through conductor 28, the current-limiting resistor 30, conductor 34, conductor 70, transistor 66, conductor 72, and conductor 73 to ground 62. The capacitor is prevented from recharging as long as the sync signal is present to maintain the transistor 66 saturated.

The discharge rate of the capacitor is limited by means of the resistance 30 which can be in the order of approximately 560 ohms. It takes approximately 1 to 2 minutes (this factor is subject to adjustment) for the capacitor to attain the 25–30 volts required as breakdown voltage for the four-layer diode 42; this time lapse being generally sufficient to allow the knob 10 to be pulled to an on position and effect tuning of the television receiver and discharge of the capacitor 22, which would otherwise turn the set off again.

The tank circuit is loosely coupled at all times to a source of the synchronizing signals in the television receiver through a small capacitor 78 of 82 pF so that immediately upon tuning there appears a synchronizing signal and the tank circuit will be activated at the second harmonic of the synchronizing signal. The second harmonic was chosen (1) because it requires a smaller inductance than the fundamental harmonic of 15.75 kc and, (2) all the vertical and equalizing pulses (which occur at a 31.5 kc rate) are effected substantially equally by any feedback from the tank circuit.

The inductor 48 is tapped at approximately 10 percent from the ground end and connects to the base 64 of the transistor 66 and the collector 80 as indicated in FIG. 1 is connected to the positive terminal 22 of the capacitor 24 through conductors 70, 34, 28, and is protected by resistor 30. It will be noted that the collector and discharge current-limiting resistor 30 connects to a voltage divider composed of resistors 40 and 82 at junction 36. Resistor 40 is in the order of 4.7 megohms and resistor 82 is in the order of 820,000 ohms. As will be seen in the embodiment of FIG. 3, the voltage divider is superfluous and a single charging resistor from B+ to junction 36 is sufficient.

In operation, the control knob 10 is pulled outwardly to manually turn on the television receiver, the plunger 12 being displaced downwardly (FIG. 1) from its normal position. Before the set is tuned and the tubes heated, no sync signal will appear to activate the tank circuit 44, and consequently the B+ voltage from source 20 will cause a charging current to flow into anode 22 of the 100 microfarad 35 volt capacitor 24, the other terminal 90 of the capacitor being connected to ground 62 through conductor 92, junction 93, and conductor 94. The time constant for the charging circuit is determined to be from about 1 to 2 minutes before reaching the 25–30 volt breakdown of the four-layer diode 42, which will pass current through conductor 94 from the anode 22 of the capacitor and through the gate 98 of a silicon controlled rectifier 96 (hereinafter referred to as SCR) to ground. This will trigger the SCR causing it to become conductive. The coil 14 of the DC solenoid (nominally 120 volts) will be energized from voltage source 20 with current flowing from source 20 through conductor 16, coil 14, and SCR 96 to ground, causing plunger 12 to be pulled into the solenoid moving the push-pull switch to the "open" position, deenergizing voltage source 20. Assuming that the station is tuned before the 1 to 2 minute interval, the sync signal will appear and tank circuit 44 will be activated at 31.5 kc. When the tank circuit is activated, the transistor 66 is saturated and junction 36 is connected through conductors 70 and the transistor 66 which is rendered conductive by the tank circuit, through conductors 72, 73, junction 75, and conductor 77 to ground 62. The positive terminal 22 of the capacitor discharges through conductor 28, current-limiting resistor 30, conductor 34, junction 36, conductor 70 to transistor 66, thereby discharging the capacitor. When the station leaves the air, or the station is malfunctioning, or if the set is no longer tuned so that a sync signal is no longer present, the tank circuit 44 is deactivated and transistor 66 is rendered nonconductive whereupon the current which had been flowing through transistor 66 will now start charging capacitor 24 through resistor 30, and after an interval from one to two minutes, the capacitor voltage reaches the breakdown voltage of from 25–30 volts of the four-layer diode 42 (less the small IR drop across resistor 30) triggering the four-layer diode into conduction. Electrolytic capacitor 24 will discharge through conductor 28, resistor 30, junction 32, conductor 31, four-layer diode 42, conductor 94, junction 95, conductor 97 and the gate 98 of SCR 96, triggering the SCR into conduction which energizes the DC solenoid from the B+ supply of the television receiver.

The plunger 12 of the solenoid is pulled to the center of the coil 14, thus pulling the control knob inward and opening the AC switch of the television receiver. The DC solenoid, which may be in the order of 120 volts, will immediately discharge the filter capacitors of the television receiver. A resistor 100 of approximately 1,000 ohms will keep the gate of the SCR at the SCR cathode potential (ground) when the four-layer diode is nonconductive, thus preventing triggering of the SCR from some extraneous pulse.

Consequently, the absence of a sync signal for about one to two minute intervals will automatically turn the television receiver off.

Figure 2:
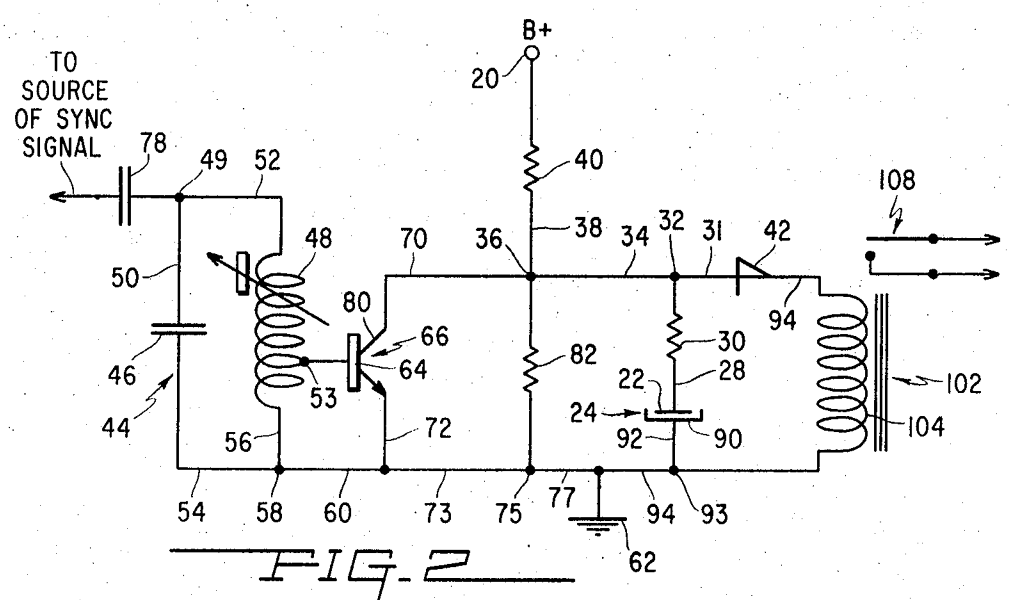
FIG. 2 is a schematic diagram of a second embodiment of my invention illustrating how the circuit of FIG. 1 can be embodied with the stepping relay of a remote control receiver.

In a second embodiment of the invention, illustrated in FIG. 2, there is used the same components and arrangement as illustrated in the prior embodiment, except that in place of the push-pull AC switch comprised of the knob 10, plunger 12, and solenoid coil 14, SCR 96 and resistor 100, a relay 102 is substituted. This circuit is adapted to a television receiver remote control device in which the on-off function is performed by a stepping relay. In such a relay there may be only two positions in which "on" and "off" alternate. Or, there may be more positions, such as four, in which the first three steps are "volume" positions with the on-off function in the "on" position and the fourth step the "off" position. Such stepping relays are actuated remotely by depressing a button on a transmitting device which causes the normally open contacts of a relay in the remote control receiving device to momentarily close, which causes the stepping relay to be momentarily energized, "stepping" it to the next position. The momentary closing of any normally open contacts in parallel with the normally open contacts of the aforementioned relay in the remote control receiving device will also cause the stepping relay to advance to the next position.

Instead of the gate 98 of an SCR and its shunting resistor 100, the coil 104 of relay 102 is substituted. Relay 102 has form A (normally open) contacts 108 which are connected in parallel with the form A contacts of the relay in the remote control receiving device which causes the stepping relay to be actuated. When a stepping relay is used, the electrolytic capacitor 24 must be charged and discharged through the four-layer diode 42 and relay coil 104 as many times as the steps which are required to turn off the receiver. Thus, a firing of the four-layer diode by loss of the sync signal in the same manner and under the same conditions as described in FIG. 1 will produce a first operation of the multistep stepping circuit, and as many subsequent firings are required as there are steps in the stepping circuit to shut off the television set. Since the four-layer diode 42 does not completely discharge the electrolytic capacitor 24, the electrolytic capacitor will start charging again from a partially charged condition, and therefore, a shorter period of time is entailed between the first and second steps of the stepping relay. In other words, whatever time interval was required to initially fire the four-layer diode 42, by charging of the capacitor, will not be required upon a second firing because the second time interval does not start from a completely discharged state as does the first interval. After the second step, the electrolytic capacitor will again start charging from a partially charged state so the time interval between the second and third steps is the same as between the first and second step. The third step will shut off the television receiver and eventually the voltage on the electrolytic capacitor will slowly discharge from its partially discharged state through the charging resistor 40.

Since the relay contacts 108 of the relay 102 can be used to energize the solenoid of the on-off switch, it will be seen that in effect, a relay 102 can be used in place of an SCR 96 (FIG. 1).

In all other respects, the operation of the circuit in FIG. 2 is the same as described in FIG. 1, and the same reference numerals are applied for the same components in FIG. 2 as used in FIG. 1 to illustrate the same function and operation.

To deliver more energy to the relay coil 104, it would be desirable to place the current-limiting resistor 30 between junctions 32 and 36 so that electrolytic capacitor 24 connects between junctions 32 and 93.

Figure 3:
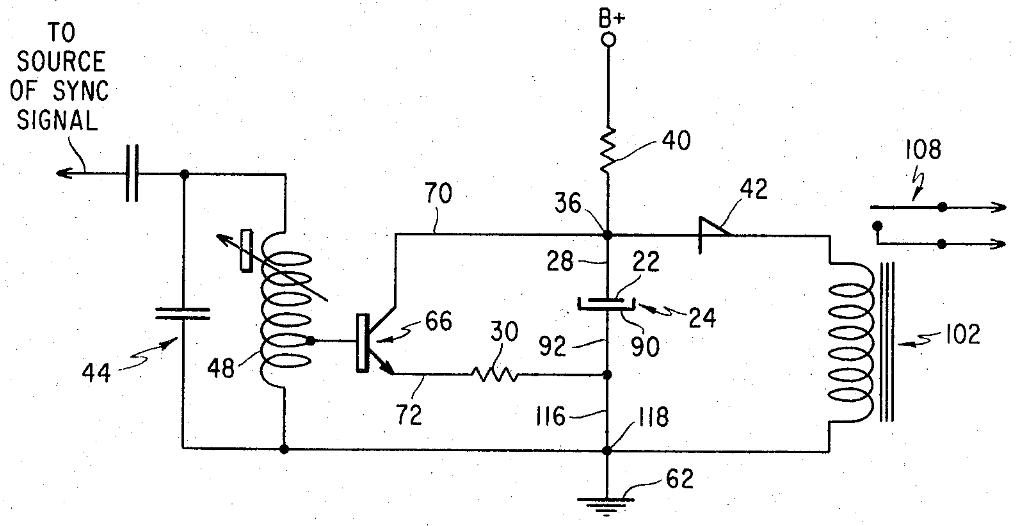
FIG. 3 is a schematic diagram of a further embodient of my invention which is a modification of the embodiment in FIG. 2 using one less resistor than that of FIG. 2.

Referring next to FIG. 3, when a relay is used, the current-limiting resistor 30 previously used in conductor 28 (FIG. 2) can be used in the emitter circuit 72 connected to ground through conductor 116, and junction 118. The embodiment shown in FIG. 3 is a practical circuit used for employing a relay to operate a solenoid or a stepping relay. The current-limiting resistor 30 of 470 ohms is placed in series with the emitter of the transistor 66 where it serves two purposes: (1) It limits the 100 microfarad capacitor 70 discharge current through the transistor 66, and (2) minimizes the effect of noise when no signal is present which, without the emitter resistor 30 causes slight conductivity of the transistor 66 which may prevent the electrolytic capacitor 24 from charging to the firing voltage of the four-layer diode 42. With the circuit constants the same as indicated in the prior embodiment, except as noted a 270 volt source acting through an 8.2 megohm resistor 40 will cause the relay 108 to be actuated in about 75 seconds after loss of the sync signal. The four-layer diode may be fired at about 16 volts. One less resistor is required in FIG. 3 than is used in FIG. 2.

Figure 4:
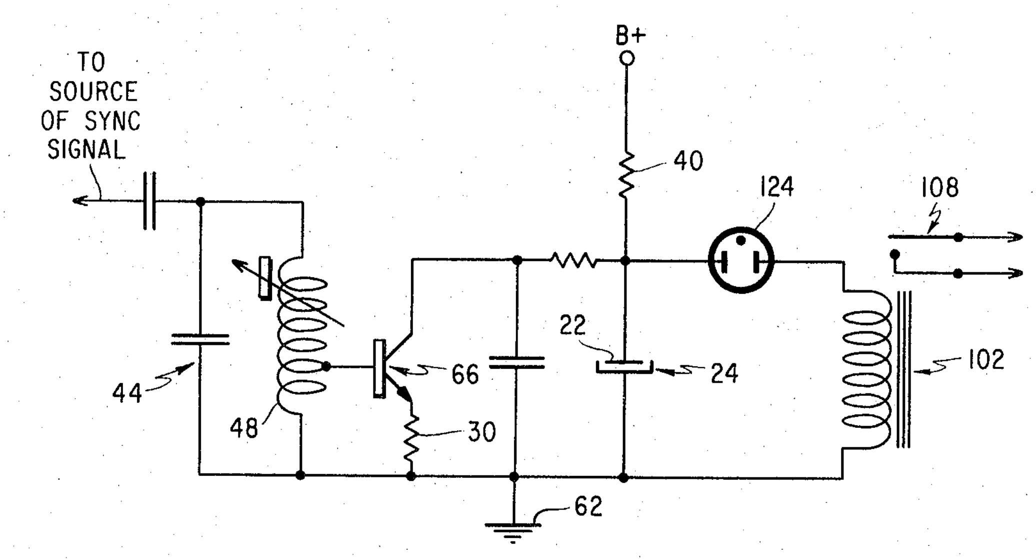
FIG. 4 is a schematic diagram illustrating a further embodiment of my invention in which a neon lamp is substituted for the four-layer diode.

In a still further embodiment of the invention, illustrated by the schematic diagram of FIG. 4, there is substituted in place of four-layer diode 42, a neon bulb 124, which may be a type NE-2H. The neon bulb serves the same function as does the four-layer diode 42 in FIG. 3 and as a switching device is much less expensive than the four-layer diode. The voltage breakdown of the neon lamp is in the order of 60 to 100 volts which necessitates the use of a transistor 66 having a collector breakdown voltage greater than the 100 volts anticipated as usable with the neon lamp. A silicon transistor with a collector-to-base breakdwon voltage over 100 volts is applicable in this circuit. Its DC gain may be as low as 10 and its AC gain is of no consequence. The transistor must have a low leakage, but silicon transistors are noted to have intrinsically low leakage properties. The circuit functions in the same manner as that described for FIG. 3, the only difference being the substitution of a neon bulb in lieu of the four-layer diode 42. The capacitor 24 is a 150 volt 16 microfarad unit and the resistance 40 is 4.7 megohms, all other circuit constants being as noted in FIG. 3.

The system operates to effect shut-off of the television receiver when there is a loss of sync signal sensed by the tank circuit 44. The tank circuit causes the transistor 66 to become conductive or nonconductive, depending upon the presence or absence of the sync signal, and when there is loss of sync signal and the transistor is nonconductive, the positive electrode 22 of the capacitor will become charged to the firing voltage of the neon bulb 124, which firing voltage will be attained after a predetermined time lapse after loss of the sync signal; the relay 102 will then be operated by firing of the neon lamp which will cause either the solenoid (FIG. 1) to be actuated, or the stepping relay to be actuated (several steps may be required) to effect shut-off of the television receiver.

One of the principal advantages in the use of a neon lamp is the substitution of a substantially less expensive component in place of the four-layer diode, and it has been found that the neon lamp can be used with relatively inexpensive transistors which have collector breakdown voltages in excess of 100 volts.

A neon lamp may be used to trigger the SCR to actuate the solenoid of FIG. 1. For this application a low-current neon lamp such as type NE-2 may be employed. Instead of an electrolytic capacitor, a paper, or film type, of the order of 1 to 2 microfarads may be used. For a comparable time delay, a much larger charging resistance, in the order of 50 megohms, will be required. To keep the value of the charging resistor practical and minimize the effect of leakage, consider the circuit of FIG. 5. Here the charging resistor 40 connects to junction 143 of a voltage divider composed of resistors 140 and 141. Resistor 140 may go directly to B+, as does resistor 40 in FIG. 1, or go to B+ through the winding 14 of the solenoid. The advantage of the connection of FIG. 5 is that if the components of FIG. 5 are not close to the solenoid, or if the components (exclusive of the solenoid) are mounted on a printed circuit board, only one lead 144 is required to connect to the solenoid.

Transistor 66 connects to the voltage divider junction 143. The voltage to ground of voltage divider junction 143 must be less than the collector-to-base breakdown voltage of the transistor 66, yet greater than the firing voltage of the neon lamp 124. The collector of transistor 66 could connect to the junction 32 and the voltage divider 140 and 141 eliminated. The charging resistor 40 would then connect to either side of the solenoid winding 14. In this event, the charging resistor would have two or three times as large in resistance value and the collector-to-base leakage of the transistor 66 would become effective in making the timing erratic.

Figure 5:
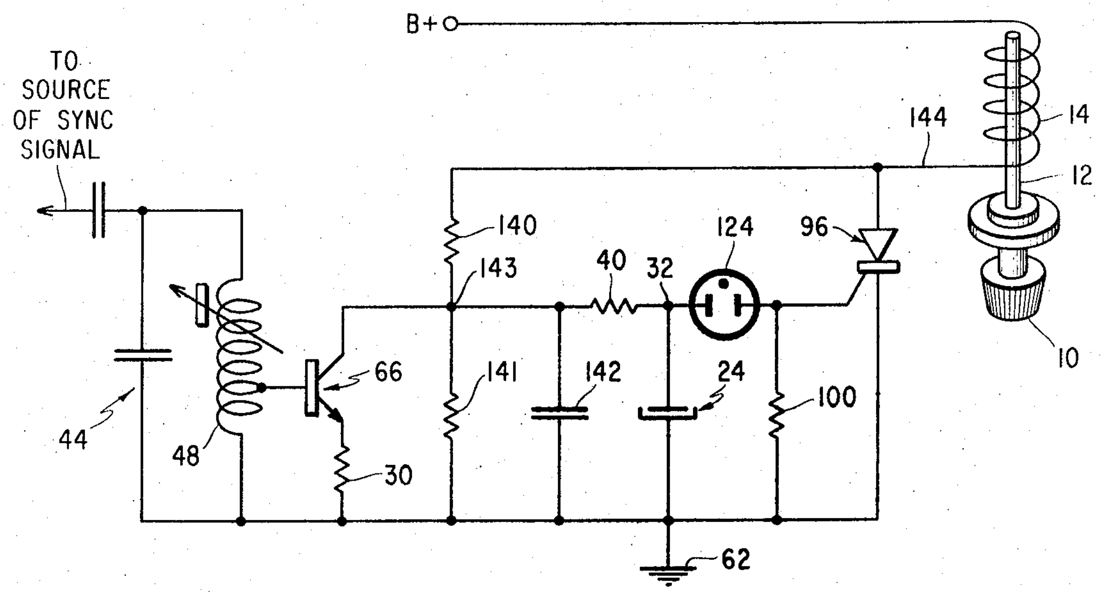
FIG. 5 is a schematic diagram of a further embodiment of the invention.

In the circuit of FIG. 5 an additional capacitor 142 in the order of 0.001 to 0.01 microfarad is required between the collector of transistor 66 and ground. When a sync signal is present, this capacitor 142 "holds" the collector voltage of the transistor at saturation value level between conduction peak of the 31.5 kc voltage applied to the base.

Typical values of circuit constants in FIG. 5 are: resistor 140, 6.8 megohms; resistor 141, 4.7 megohms; charging resistor 40, 50 megohms; charging capacitor 24, 1 microfarad; and "holding" capacitor 142, 0.001 microfarad. These embodiments particularly illustrate means of multiple use of components when an automatic shut-off circuit is incorporated.

Figure 6:
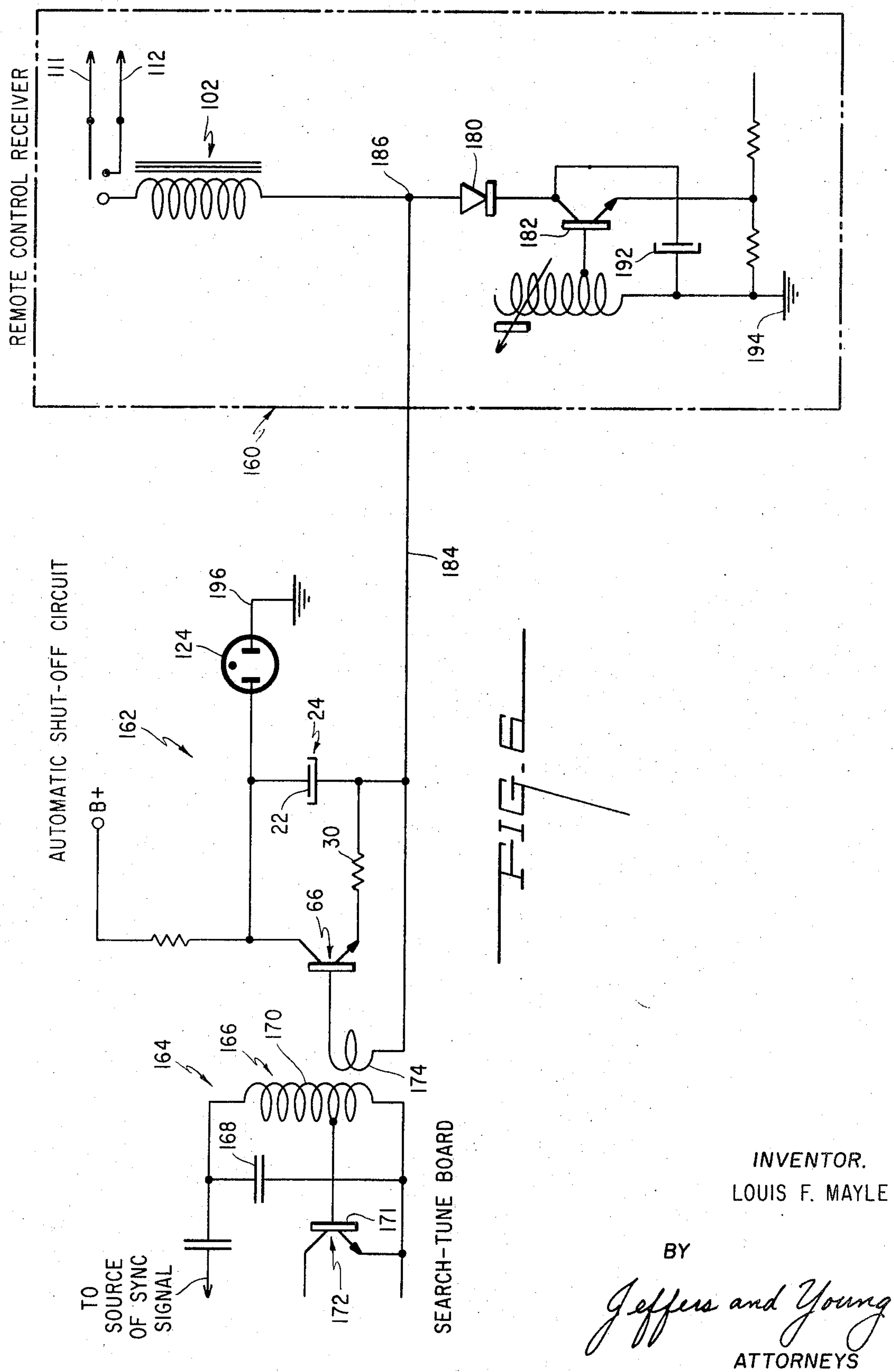
FIG. 6 is a schematic diagram of a still further embodiment of the invention in which the circuit of FIG. 4 is combined with a remote control receiver and is associated through an electrically isolated secondary with a search tune circuit.

Referring next to the embodiment shown in FIG. 6, there is illustrated within a remote receiver, designated generally by reference numeral 160, a relay 102 for controlling a stepping relay through conductors 111 and 112, for changing volume and shutting off the television receiver. Also illustrated is a 31.5 kc tank circuit 166 consisting of capacitor 168 and tapped inductance coil 170 which is associated with other auxiliary circuits in a television receiver. Coupled to inductance coil 170 is a secondary coil 174 which connects to the base of transistor 66 of the automatic shut-off circuit, replacing the tapped portion of coil 48 shown in FIGS. 1 through 5.

As a first example, the control relay 102 in the remote control receiver 160 to control the stepping relay is actuated either by the switching transistor 182 or the automatic shut-off circuit designated generally by reference numeral 162, said shut-off circuit being comprised generally of the same circuit components as indicated in FIG. 4, i.e., a transistor 66, capacitor 24 and neon bulb 124 which provides a time delay of a predetermined amount when there is a loss of a sync signal.

As a second example, the automatic shut-off circuit 162 may obtain its 31.5 kc signal from a tank circuit which is used in other circuitry associated with a television receiver. An example of such a tank circuit is that associated with the search-tune circuitry as disclosed in copending Application No. 386,207 filed July 30, 1964 and titled Search Tune System For Television Receivers, now U.S. Pat. No. 3,388,215 and designated generally by reference numeral 164 which is comprised of a tank circuit 166 including a capacitor 168, an inductance coil 170 which is tapped at about 10 percent from the end to a base 171 of a transistor 172 whose emitter is connected with the end of coil 170.

The sync signal circuitry is connected to a sync source. The automatic shut-off has an electrically isolated secondary 174 inductively coupled to the primary winding of the inductance portion of the tank circuit in the search tune circuit. As indicated in FIG. 6 conventional circuitry is provided in the remote control receiver 160; added diode 180 connects between the relay coil of the relay 102 controlling the stepping relay and the collector of switching transistor 182. The normally grounded components of the embodiment shown in FIG. 4 are connected to the junction 186 of the coil of relay 102 and diode 180 by conductor 184 so that when the neon bulb 124 fires, the electrolytic capacitor 24 and its parallel components will be driven negative, opening the added diode 180. The electrolytic capacitor 24 will discharge through the neon bulb 124 and coil of relay 102 until the extinction voltage of the neon bulb 124 is reached.

If the electrolytic capacitor 192 in the remote control receiver 160 between the collector of the switching transistor 182 and ground 194 is small, of the order of 5 microfarads or less, then the added diode 180 may not be required. In this event, some of the charge of the electrolytic capacitor 24 of the automatic shut-off circuit 162 is dissipated neutralizing the charge on the switching transistor bypass capacitor 192. One terminal 196 of the neon bulb 124 may be connected to the B+ terminal of the remote control receiver 160, thus permitting a higher voltage buildup on the electrolytic capacitor 24 before the neon bulb fires.

As indicated in FIG. 6, there is shown a secondary 174 added to the sync tank coil 170 of the search tune circuit for the automatic shut-off circuit 162. The sync tank coil 170 may also be associated with the automatic shut-off circuitry and the secondary 174 added for the search tune circuitry. Either way, the 31.5 kc voltage applied to the base of the automatic shut-off transistor 66 should be 10–20 percent greater than the 31.5 kc voltage applied to the base of the switching transistor 172 in the search tune circuit. The reason is that the base circuit of the switching transistor 172 of the search tune circuit is of low impedance (emitter and base connected across tapped voltage) while the base circuit of the automatic shut-off transistor 66 is a higher impedance due to the emitter resistor 30. If the 31.5 kc base voltages were equal, and since they are coupled, the low impedance base circuit would conduct most of the current, leaving practically none for the higher impedance base circuit. So by providing a little higher 31.5 kc voltage for the higher impedance base circuit, sufficient current is delivered.

One of the areas of investigation of the present invention was to determine whether unpredictable leakages of the electrolytic capacitors would prevent suitable useage as part of the timer mechanism. It was found, using a substantially diverse number of capacitors, including those which were idle for a substantial period of time, that excessive leakage would eventually diminish, the necessary charge would build up and the circuit would eventually operate satisfactorily and the time for fully charging the capacitor after a period of time was within a suitable time spread.

In operation, referring to FIG. 6, should the sync signal of the search tune circuit indicate that the station has gone off the air, the tank circuit will be deactivated and the transistor 66, forming part of the automatic shut-off circuit, will be rendered nonconductive thereby allowing build up of positive voltage on the anode 22 of electrolytic capacitor 24 and if the loss of sync signal continues for a predetermined period of time, the neon lamp 124 will fire thereby driving the cathode of charged electrolytic capacitor 24 negative, opening diode 180, and energizing coil of relay 102, causing contacts of relay 102 to close, thereby energizing the stepping relay of the remote control receiver.

Should the neon bulb 124 of the automatic shut-off circuit be fired the necessary number of times, the relay 102 controlling the stepping relay of the remote control receiver 160 will be operated the necessary number of times to effect shut-off of the set.

Although a four-layer diode and neon bulb have been specifically mentioned as the discharge devices forming part of the timing mechanism of the automatic shut-off circuit, other gaseous and electronic discharge devices may equally be used. A four-layer diode was mentioned in conjuncion with an SCR, but obviously a neon bulb or other gaseous discharge device may also be used with an SCR.

Also, although the sync signal was referred to as a means for rendering the transistor conductive in order to prevent the electrolytic capacitor from charging while a program is being received, such other signals as a video I-F picture carrier, video I-F sound carrier, or 4.5-MC sound carrier or even an audio signal can be used for this purpose.

When the present invention is adapted to a radio receiver, the I-F carrier or the audio signal may be used in a similar automatic shut-off circuit and the audio signal in this instance is taken directly from the speaker terminals as one of the simpler expedience. In a radio receiver the hiss due to noise when no other signal is being received would have to be filtered out in order to render the transistor nonconductive.

Although the present invention has been illustrated and described with certain selected example embodiments, it will be understood that these are illustrative of the invention and are by no means restrictive thereof.

I claim:

1. An apparatus for automatically turning off a television set having an on-off switch, said on-off switch controlling the source of electrical energy for both said television set and said apparatus comprising:

- manually operable means for moving said switch to the on position;
- electrical means associated with said switch and energizable for moving said switch to the off position thereof;
- a capacitor in circuit with said electrical means operable when charged to a predetermined voltage level to cause momentary energization of said electrical means;
- a charging circuit connected to said capacitor operable to charge said capacitor at a predetermined rate, said charging cicuit being a purely passive circuit connected to a direct current potential difference within the television set;
- a discharging circuit connected to said capacitor;
- said charging circuit being under the control of said switch and initiating charging of said capacitor upon movement of said switch to the on position thereof so that a predetermined time after movement of said switch to the on position thereof said capacitor will be charged to said predetermined voltage level unless previously discharged via said discharging circuit;
- said discharging circuit comprising a transistor having the collector-emitter path thereof connected in shunting relation to said capacitor;
- a tank circuit coupled to the base of said transistor and operable when energized at the resonant frequency thereof to supply signals to the base of said transistor to make said transistor conductive and thereby discharge said capacitor at a rate not less than the rate at which said capacitor is charged by said charging circuit, whereby, when both said charging and said discharging circuits are operating, said capacitor is prevented from charging;
- said tank circuit being connected to the television set to receive therefrom a signal received by the television set, whereby, when said television set signal ceases, said discharging circuit becomes inoperative allowing said charging circuit to charge said capacitor thus energizing said electrical means so as to turn said television set and said apparatus off;
- said tank circuit having as the said resonant frequency a frequency equal to n times the frequency of occurrence of synchronizing pulses in the received signal, wherein *n* is a whole number greater than one.

2. The apparatus of claim 1 wherein said charging circuit is a purely resistive network connecting said capacitor across a direct current potential within said television set.

3. An apparatus according to claim 1 which includes a first component in the circuit connecting said capacitor with said electrical means which is nonconductive below said predetermined voltage level.

4. An apparatus according to claim 3 which includes a normally nonconductive second component in the energizing circuit for said electrical means, said second component having a gate responsive to a voltage signal to become conductive thereby to effect energization of said electrical means, said gate being connected to receive a signal from said first component when the latter becomes conductive at said predetermined voltage level.

5. An apparatus according to claim 3 in which said first component is a neon bulb.

6. An apparatus according to claim 3 in which said first component is a diode.

7. An apparatus according to claim 6 in which said first diode is a four layer diode.

8. An apparatus according to claim 1 in which said switch has a plurality of on positions into which it is movable in succession prior to moving to the off position thereof.

9. An apparatus for automatically turning off a television set having an on-off switch said on-off switch controlling the source of electrical energy for both said television set and said apparatus; manually operable means for moving said switch to the on position, electrical means associated with said switch and energizable for moving said switch to the off position thereof, a capacitor in circuit with said electrical means operable when charged to a predetermined voltage level to cause momentary energization of said electrical means, a charging circuit connected to said capacitor operable to charge said capacitor at a predetermined rate, a discharging circuit connected to said capacitor, said charging circuit being under the control of said switch and initiating charging of said capacitor upon movement of said switch to the on position thereof so that a predetermined time after movement of said switch to the on position thereof said capacitor will be charged to said predetermined voltage level unless previously discharged via said discharging circuit, said discharging circuit comprising a transistor having the collector-emitter path thereof connected in shunting relation to said capacitor, a tank circuit coupled to the base of said transistor and operable when energized at the resonant frequency thereof to supply signals to the base of said transistor to make said transistor conductive and thereby discharge said capacitor at a rate not less than the rate at which said capacitor is charged by said charging circuit, said tank circuit being connected to the television set to receive therefrom a signal received by the television set whereby when said television set signal ceases, said discharging circuit becomes inoperative allowing said charging circuit to charge said capacitor thus energizing said electrical means so as to turn said television set and said apparatus off, and said tank circuit having as the said resonant frequency a frequency equal to n times the frequency of occurrence of synchronizing pulses in the received signal, where *n* is a whole number greater than one.

* * * * *